US011170567B2

(12) United States Patent
Omari et al.

(10) Patent No.: US 11,170,567 B2
(45) Date of Patent: Nov. 9, 2021

(54) DYNAMIC OBJECT DETECTION MODEL BASED ON STATIC MAP COLLECTION DATA

(71) Applicant: Woven Planet North America, Inc., Los Altos, CA (US)

(72) Inventors: Sammy Omari, Menlo Park, CA (US); Sameer Qureshi, Sunnyvale, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 0 days.

(21) Appl. No.: 16/457,653

(22) Filed: Jun. 28, 2019

(65) Prior Publication Data

US 2020/0410751 A1    Dec. 31, 2020

(51) Int. Cl.
*G06K 9/00*    (2006.01)
*G06T 17/05*   (2011.01)
*G06N 3/08*    (2006.01)
*G06F 16/29*   (2019.01)

(52) U.S. Cl.
CPC .............. *G06T 17/05* (2013.01); *G06F 16/29* (2019.01); *G06K 9/00201* (2013.01); *G06K 9/00791* (2013.01); *G06N 3/088* (2013.01); *G06T 2207/20081* (2013.01); *G06T 2207/30252* (2013.01)

(58) Field of Classification Search
CPC ........ G06N 3/088; G06N 20/00; G06T 17/05; G06T 2207/30252; G06T 2207/20081; G06K 9/00791; G06K 9/00201; G06K 9/00805; G06F 16/29
See application file for complete search history.

(56) References Cited

U.S. PATENT DOCUMENTS

| 9,183,459 | B1 * | 11/2015 | Zhang | G06K 9/6293 |
| 9,235,214 | B2 * | 1/2016 | Anderson | G05D 1/0088 |
| 10,217,346 | B1 * | 2/2019 | Zhang | H04B 17/318 |
| 10,810,445 | B1 * | 10/2020 | Kangaspunta | G06K 9/6262 |
| 10,921,817 | B1 * | 2/2021 | Kangaspunta | G01S 17/931 |
| 10,929,711 | B1 * | 2/2021 | Pfeiffer | G06N 20/00 |
| 2007/0088469 | A1 * | 4/2007 | Schmiedel | G05D 1/0274 701/23 |
| 2017/0307735 | A1 * | 10/2017 | Rohani | G01S 7/417 |
| 2017/0369051 | A1 * | 12/2017 | Sakai | B60W 10/04 |

(Continued)

*Primary Examiner* — Phong X Nguyen
(74) *Attorney, Agent, or Firm* — Christopher G. Darrow; Darrow Mustafa PC

(57) ABSTRACT

Systems, methods, and non-transitory computer-readable media can obtain information describing a static map of a geographic location, wherein the static map is determined based at least in part on a plurality of three-dimensional representations of the geographic location captured by one or more sensors of one or more vehicles. At least one training example that includes visual features and a corresponding label can be generated based on an unsupervised process for generating training examples, wherein the visual features are extracted based on the static map and at least one three-dimensional representation of the geographic location. At least one machine learning model can be trained to distinguish between static objects and non-static objects in visual data based on the at least one training example, wherein the at least one machine learning model is trained based on an unsupervised learning process.

20 Claims, 10 Drawing Sheets

(56) References Cited

U.S. PATENT DOCUMENTS

| | | | |
|---|---|---|---|
| 2018/0364717 A1* | 12/2018 | Douillard | G05D 1/0212 |
| 2019/0147245 A1* | 5/2019 | Qi | G06K 9/3233 |
| | | | 382/103 |
| 2019/0227553 A1* | 7/2019 | Kentley-Klay | B60L 15/20 |
| 2019/0228571 A1* | 7/2019 | Atsmon | G06T 19/006 |
| 2019/0339709 A1* | 11/2019 | Tay | G05D 1/0088 |
| 2020/0103523 A1* | 4/2020 | Liu | G01S 13/931 |
| 2020/0133303 A1* | 4/2020 | Sakaguchi | G05D 1/0274 |
| 2020/0134372 A1* | 4/2020 | Roy Chowdhury | G05D 1/0088 |
| 2020/0172098 A1* | 6/2020 | Abrahams | B60W 10/04 |
| 2020/0193552 A1* | 6/2020 | Turkelson | G06N 3/08 |
| 2020/0200907 A1* | 6/2020 | Li | G06T 17/05 |
| 2020/0217964 A1* | 7/2020 | Chen | B60W 60/0027 |

\* cited by examiner

500

Obtain information describing a static map of a geographic location, wherein the static map is determined based at least in part on a plurality of three-dimensional representations of the geographic location captured by one or more sensors of one or more vehicles
502

Generate at least one training example that includes visual features and a corresponding label based on an unsupervised process for generating training examples, wherein the visual features are extracted based on the static map and at least one three-dimensional representation of the geographic location
504

Train at least one machine learning model to distinguish between static objects and non-static objects in visual data based on the at least one training example, wherein the at least one machine learning model is trained based on an unsupervised learning process
506

FIGURE 5A

DYNAMIC OBJECT DETECTION MODEL BASED ON STATIC MAP COLLECTION DATA

FIELD OF THE INVENTION

The present technology relates to the field of vehicles. More particularly, the present technology relates to systems, apparatus, and methods for detecting dynamic objects based on static map collection data.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to obtain information describing a static map of a geographic location, wherein the static map is determined based at least in part on a plurality of three-dimensional representations of the geographic location captured by one or more sensors of one or more vehicles. At least one training example that includes visual features and a corresponding label can be generated based on an unsupervised process for generating training examples, wherein the visual features are extracted based on the static map and at least one three-dimensional representation of the geographic location. At least one machine learning model can be trained to distinguish between static objects and non-static objects in visual data based on the at least one training example, wherein the at least one machine learning model is trained based on an unsupervised learning process.

In an embodiment, the sensors include one or more optical cameras and Light Detection And Ranging (LiDAR) sensors.

In an embodiment, generating the at least one training example further includes determining at least one group of voxels in a voxel grid representation of the geographic location having a low threshold probability of corresponding to a static object; extracting visual features associated with the at least one group of voxels from a first three-dimensional representation of the geographic location; and generating the at least one training example based on the extracted visual features, wherein the at least one training example labels the extracted visual features as a non-static object.

In an embodiment, determining the at least one group of voxels in the voxel grid representation further includes determining the voxel grid representation of the geographic location based at least in part on the static map, wherein each voxel is assigned a probability between 0 and 1 indicating whether a static object is represented within the voxel.

In an embodiment, the first three-dimensional representation of the geographic location includes at least a point cloud representation of the geographic location and a corresponding image-based representation of the geographic location.

In an embodiment, extracting visual features associated with the at least one group of voxels further includes projecting the at least one group of voxels onto the image-based representation of the geographic location and extracting the visual features from a region defined by the at least one group of voxels in the image-based representation.

In an embodiment, generating the at least one training example further includes determining at least one group of voxels in a voxel grid representation of the geographic location having a high threshold probability of corresponding to a static object; extracting visual features associated with the at least one group of voxels from a first three-dimensional representation of the geographic location; and generating the at least one training example based on the extracted visual features, wherein the at least one training example labels the extracted visual features as a static object.

In an embodiment, the systems, methods, and non-transitory computer readable media are further configured to determine at least one three-dimensional representation of a different geographic location, the at least one three-dimensional representation including a point cloud representation and a corresponding image-based representation of the different geographic location; determine one or more non-static objects that are represented in the at least one three-dimensional representation of the different geographic location based on provision of the image-based representation to the at least one machine learning model; and remove the one or more non-static objects from the at least one three-dimensional representation of the different geographic location.

In an embodiment, the one or more non-static objects are excluded from a static map generated for the different geographic location.

In an embodiment, the systems, methods, and non-transitory computer readable media are further configured to determine visual data associated with the geographic location; determine at least one object represented in the visual data; and determine whether the at least one objects is a static object or a dynamic object based at least in part on the static map.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 5A and 5B illustrate example methods, according to an embodiment of the present technology.

Figure 1A:
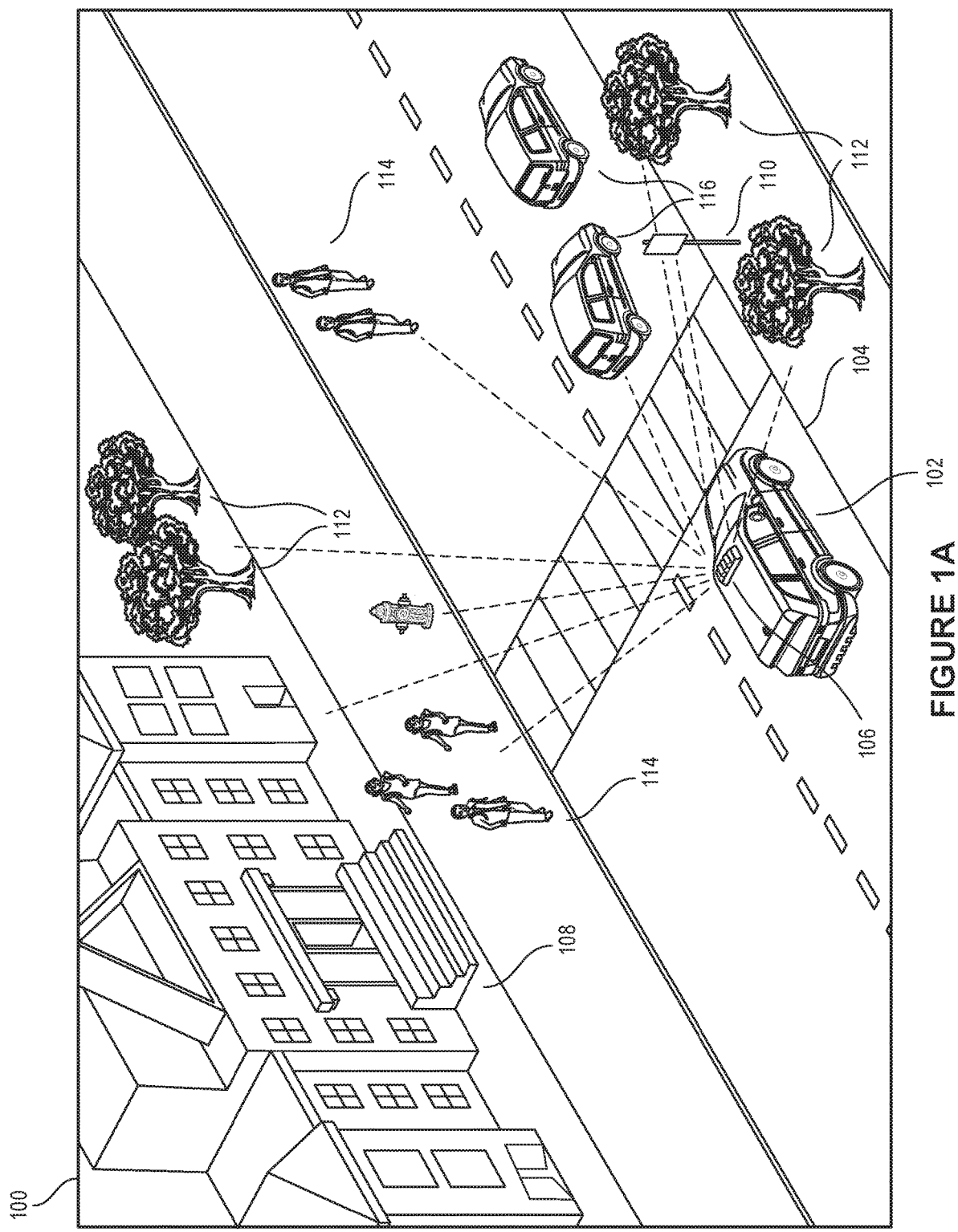
FIGS. 1A-1B illustrate various challenges that may be experienced when mapping a geographic location, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Figure 1B:
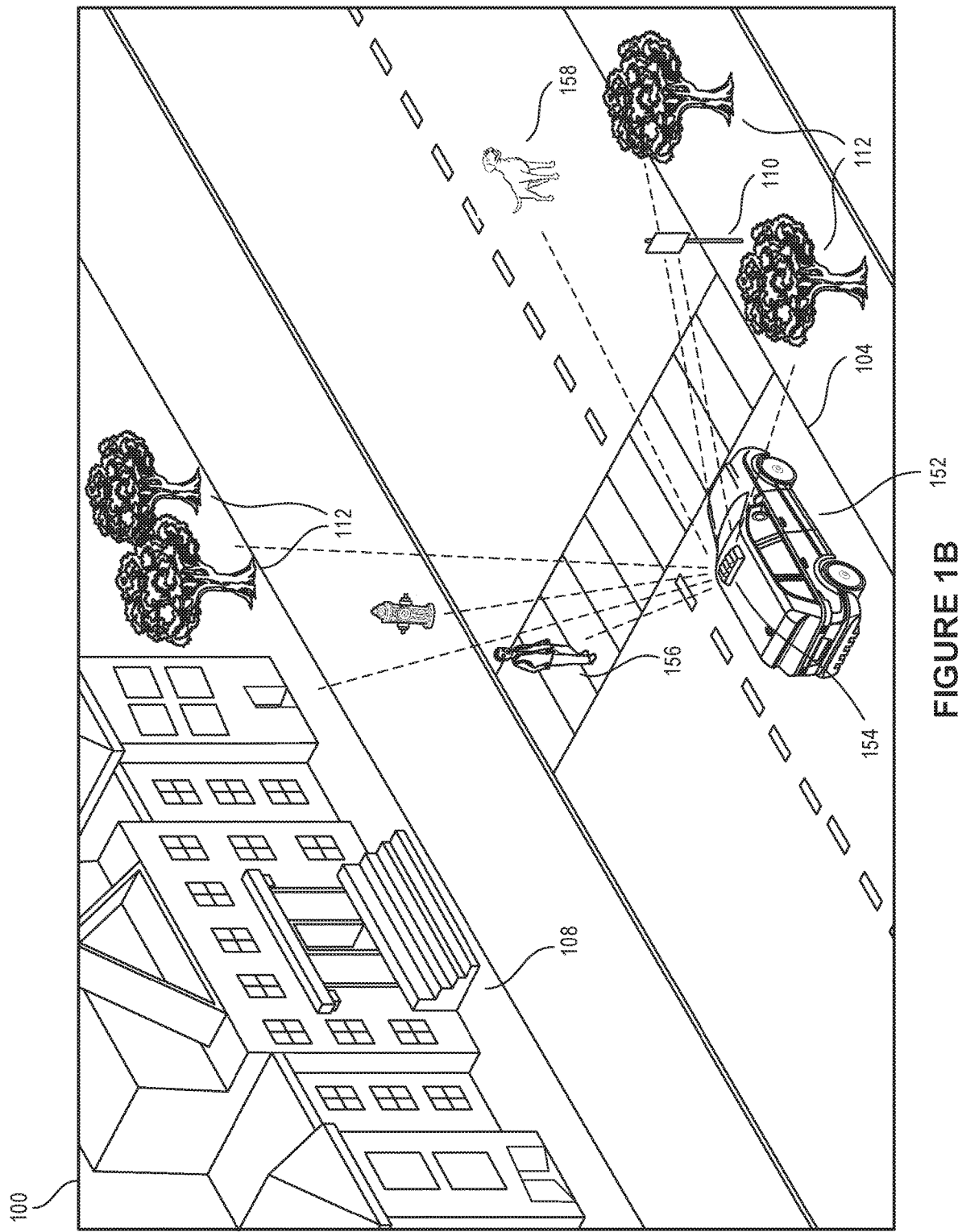
Figure 6:
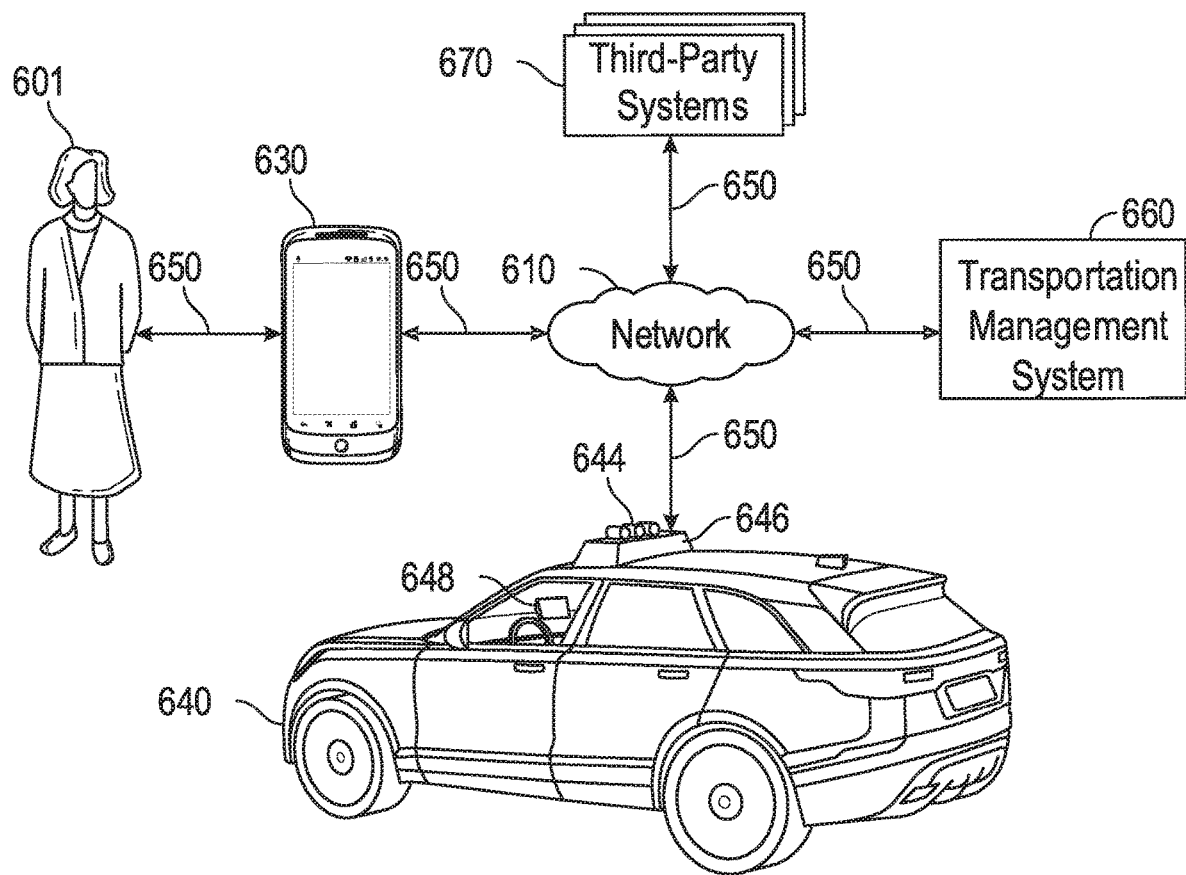
FIG. 6 illustrates an example block diagram of a transportation management environment, according to an embodiment of the present technology.

Vehicles typically rely on static maps of geographic locations for autonomous or semi-autonomous navigation. These static maps can represent geographic locations with greater resolution than traditional maps which merely provide turn-by-turn directions. For example, a static map of a geographic location can identify static objects (e.g., buildings, street signs, etc.) and road features (e.g., lane boundaries, intersections, etc.) that correspond to the geographic location. Under conventional approaches, the static map of the geographic location can be created based on sensor data (e.g., point cloud data, camera data, etc.) captured by a fleet of vehicles while navigating the geographic location. For example, FIG. 1A illustrates an example environment 100 being mapped by a vehicle 102 while navigating a road 104. The vehicle 102 can be, for example, a vehicle 640 as shown in FIG. 6. The vehicle 102 includes a sensor suite 106 that can be used to sense static (or stationary) objects, dynamic objects (e.g., objects in motion), and semi-permanent (or ephemeral) objects that are around (or within some threshold proximity of) the vehicle 102. In this example, information collected by sensors included in the sensor suite 106 can be used to determine the presence of static objects within the environment 100, such as a building 108, traffic sign 110, trees 112, and other static objects (e.g., fire hydrant). The collected information can also be used to determine the presence of non-static objects (e.g., dynamic and semi-permanent objects) within the environment 100, such as pedestrians 114 and vehicles 116. In some embodiments, the collected information can include a three-dimensional representation of the environment 100 based on point cloud data and a corresponding image data captured by sensors in the sensor suite 106. To ensure that a static map of the environment 100 distinguishes between static and non-static objects with a threshold level of accuracy, a fleet of vehicles typically needs to capture a significant number of three-dimensional representations of the environment 100 under varying conditions (e.g., traffic conditions, weather conditions, etc.). Each three-dimensional representation can capture different features present within the environment 100 depending on when the representation was captured. For example, FIG. 1B illustrates the example environment 100 being mapped by a different vehicle 152 at another point in time. The vehicle 152 can be, for example, the vehicle 640 as shown in FIG. 6. The vehicle 152 includes a sensor suite 154 that can be used to sense static (or stationary) objects, dynamic objects (e.g., objects in motion), and semi-permanent (or ephemeral) objects that are around (or within some threshold proximity of) the vehicle 152. In this example, information collected by sensors included in the sensor suite 154 can be used to determine the presence of static objects within the environment 100, such as the building 108, traffic sign 110, trees 112, and other static objects (e.g., fire hydrant). The collected information can also be used to determine the presence of non-static objects (e.g., dynamic and semi-permanent objects) within the environment 100, such as a pedestrian 156 within a crosswalk and an animal 158 on the road 104. In some embodiments, the collected information can include a corresponding three-dimensional representation of the environment 100 based on point cloud data and corresponding image data captured by sensors in the sensor suite 154. Under conventional approaches, a static map of the environment 100 can be generated based on captured three-dimensional representations of the environment 100. In general, the three-dimensional representations can be evaluated by human operators to produce the static map of the environment 100. For example, the human operators can be tasked with manually generating supervised training examples for training machine learning models. That is, the human operators can manually analyze three-dimensional representations of various geographic locations for purposes of labeling static, dynamic, and semi-permanent objects. The supervised training examples can be used to train one or more machine learning models to perform various operations, such as identifying particular instances of non-static objects (e.g., pedestrians, vehicles, animals, etc.). The machine learning models can be applied to identify such non-static objects so they can be excluded when generating the static map of the environment 100. Such conventional approaches for generating static maps have significant disadvantages. For example, human operators are prone to mistakes and may mis-label static, dynamic, and semi-permanent objects in training examples that ultimately result in poorly trained machine learning models. Further, having human operators manually process such vast amounts of map data can be time consuming and expensive, thereby resulting in delayed production of static maps for unmapped geographic locations while undesirably incurring significant cost. Conventional approaches pose disadvantages in addressing these and other problems.

An improved approach in accordance with the present technology overcomes the foregoing and other disadvantages associated with conventional approaches. The approach can improve static map generation for geographic locations. For example, in various embodiments, a machine learning model (e.g., semantic segmentation model) can learn to distinguish between static and non-static objects (e.g., dynamic objects, semi-permanent objects, etc.) based on an unsupervised learning process. In other words, the machine learning model can be trained without requiring human operators to manually label static and non-static objects. Once trained, the machine learning model can be applied to rapidly generate static maps for unmapped geographic locations without having to capture a significant number of three-dimensional representations of those geographic locations over a lengthy period of time. For example, in some embodiments, a static map of a first geographic location can be obtained. The static map can represent the first geographic location as a voxel grid in which each voxel is assigned a probability between 0 and 1 which indicates whether a static object (or a portion of a static object) is represented within the voxel. These probabilities can be determined based on generally known approaches for ray casting based on point cloud data. For example, a voxel in which a static object is represented can be associated with a probability of 1. In another example, a voxel in which no object is represented can be associated with a probability of 0. Over time, as many collection cycles through the geographic region are completed, the voxel grid associated with the static object map will obtain accurate determinations of what objects/environmental elements are typically present in a voxel grid and those that are ephemeral or dynamic between collection cycles over long periods of time including seasonal, weather, and any other changes that occur over long periods of time. The voxel grid of the static map of the first geographic location can be used to train the machine learning model to distinguish between static and non-static objects, as described below. In some embodiments, the machine learning model can be applied to one or more three-dimensional representations of a different geographic location to determine a static map of the different geographic location. For example, in some embodiments, the trained machine learning model can be applied to identify non-static objects in a three-dimensional representation of the different geographic location. For example, the machine learning model may identify non-static objects, such as pedestrians and animals, within an image-based representation of the different geographic location. In this example, the identified non-static objects can automatically be excluded from the static map being generated for the different geographic location and may be used to assist in object detection and classification. More details relating to the present technology are provided below.

Figure 2:
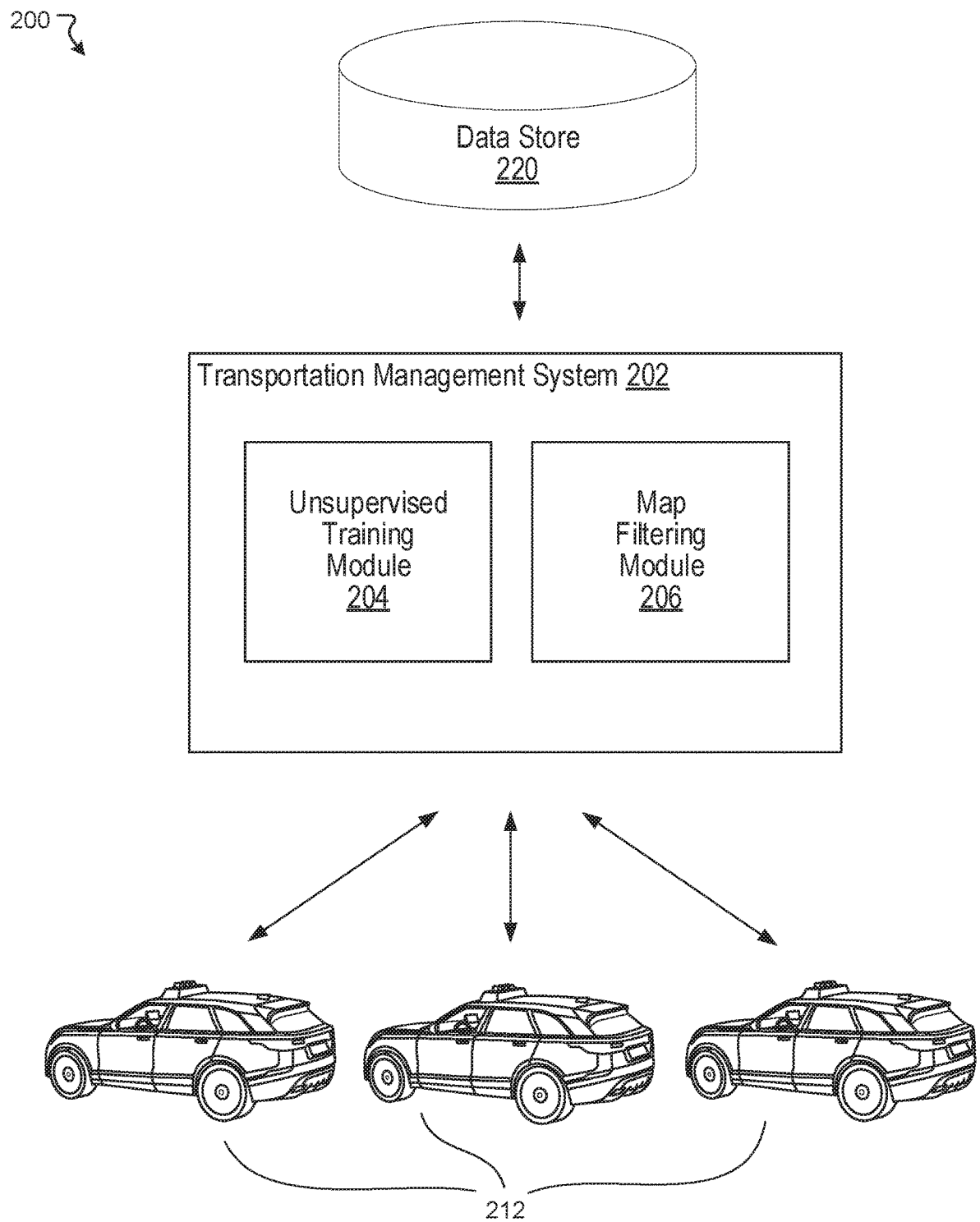
FIG. 2 illustrates an example transportation management system, according to an embodiment of the present technology.

FIG. 2 illustrates an example environment 200, according to an embodiment of the present technology. The environment 200 can include an example transportation management system 202 and a fleet of vehicles 212. The fleet of vehicles 212 may be managed by the transportation management system 202. The transportation management system 202 can be, for example, the transportation management system 660 of FIG. 6. The fleet of vehicles 212 can be, for example, a fleet comprised of numerous vehicles, such as the vehicle 640 of FIG. 6. As shown, the transportation management system 202 can include an unsupervised training module 204 and a map filtering module 206. In various embodiments, the transportation management system 202 can access sensor data collected by sensors of the fleet of vehicles 212 from various sources and geographic locations. For example, the transportation management system 202 can access sensor data from the fleet of vehicles 212 in real-time (or near real-time) over one or more computer networks. In another example, the transportation management system 202 can be configured to communicate and operate with at least one data store 220 that is local to the transportation management system 202. The at least one data store 220 can be configured to store and maintain various types of data, such as sensor data captured by the fleet of vehicles 212. In general, sensor data captured by the fleet of vehicles 212 (e.g., point cloud data, image data, video data, etc.) can provide three-dimensional representations of geographic locations. In some embodiments, some or all of the functionality performed by the transportation management system 202 and its sub-modules may be performed by one or more computing systems implemented in a vehicle, such as the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The unsupervised training module 204 can be configured to train one or more machine learning models (e.g., semantic segmentation models) for distinguishing between static and non-static objects (e.g., dynamic objects, semi-permanent objects). For example, a machine learning model can be trained to identify non-static objects that are represented in visual data (e.g., point cloud data, image data, video data) associated with a given geographic location. In another example, a machine learning model can be trained to identify static objects that are represented in visual data (e.g., point cloud data, image data, video data) associated with a given geographic location. In various embodiments, the machine learning models can be trained based on an unsupervised process without assistance from human operators. More details regarding the unsupervised training module 204 will be provided below with reference to FIG. 3A.

The map filtering module 206 can be configured to apply the trained machine learning models to generate maps of geographic locations. In some embodiments, the map filtering module 206 can generate a static map of a geographic location. For example, the map filtering module 206 can obtain a three-dimensional representation of the geographic location. The three-dimensional representation can include a point cloud representation and a corresponding image-based representation (e.g., a 360 degree image) of the geographic location. The map filtering module 206 can provide the image-based representation to a machine learning model that is trained to identify non-static objects. The machine learning model can output information identifying any non-static objects that are represented in the image-based representation. The map filtering module 206 can then exclude any identified non-static objects from the static map being generated for the geographic location. In some embodiments, the map filtering module 206 can be applied to additional three-dimensional representations of the geographic location to improve accuracy of the static map. In some embodiments, the map filtering module 206 can generate an attention map of the geographic location based on a machine learning model that is trained to identify static objects. Many variations are possible.

Figure 3A:
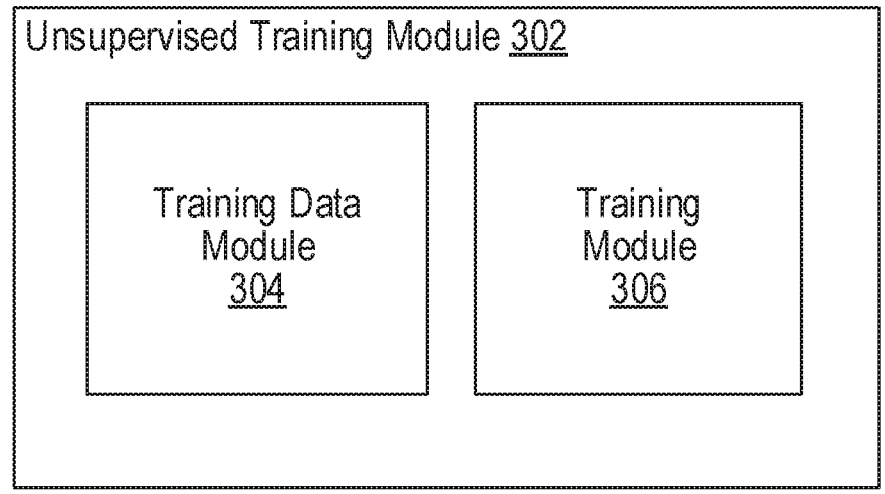
FIG. 3A illustrates an example unsupervised training module, according to an embodiment of the present technology.

FIG. 3A illustrates an example unsupervised training module 302, according to an embodiment of the present technology. In some embodiments, the unsupervised training module 204 of FIG. 2 can be implemented with the unsupervised training module 302. The unsupervised training module 302 can be configured to train one or more machine learning models to distinguish between static and non-static objects based on an unsupervised learning process. As shown in the example of FIG. 3A, the unsupervised training module 302 can include a training data module 304 and a training module 306.

The training data module 304 can be configured to generate training data for training a machine learning model. The training data can include various training examples from which the machine learning model can learn. In some embodiments, the training examples correspond to visual representations of various non-static objects (e.g., pedestrians, vehicles, animals, etc.). In such embodiments, the machine learning model can be trained to identify instances of non-static objects that are represented in visual data. In other embodiments, the training examples correspond to visual representations of various static objects (e.g., buildings, trees, sign posts, etc.). In such embodiments, the machine learning model can be trained to identify instances of static objects that are represented in visual data. More details regarding the training data module 304 will be provided below with reference to FIG. 3B.

The training module 306 can be configured to train one or more machine learning models based on training data generated by the training data module 304. For example, in some embodiments, a machine learning model can be trained to identify non-static objects that are represented in image data (or video data) captured at some geographic location. For example, the machine learning model can output respective probabilities indicating the presence of a non-static object for each pixel in the image data. In other embodiments, the machine learning model can be trained to identify static objects that are represented in image data (or video data) captured at some geographic location. For example, the machine learning model can output respective probabilities indicating the presence of a static object for each pixel in the image data. The training module 306 can train the machine learning models using generally known techniques. For example, the training module 306 can provide training data generated by the training data module 304 as examples from which the machine learning models can learn to classify objects as static or non-static objects. Many variations are possible. In some embodiments, such machine learning models can be used for object detection. For example, a machine learning model can trained to classify objects as non-static (or dynamic) objects based on the unsupervised learning process described herein. The machine learning model can be applied to three-dimensional representations of various geographic locations to identify dynamic objects, including those geographic locations for which no static map has been built. In this example, the machine learning model can be applied to identify dynamic objects represented in a three-dimensional representation of a given geographic location despite no static map having been built for the geographic location.

Figure 3B:
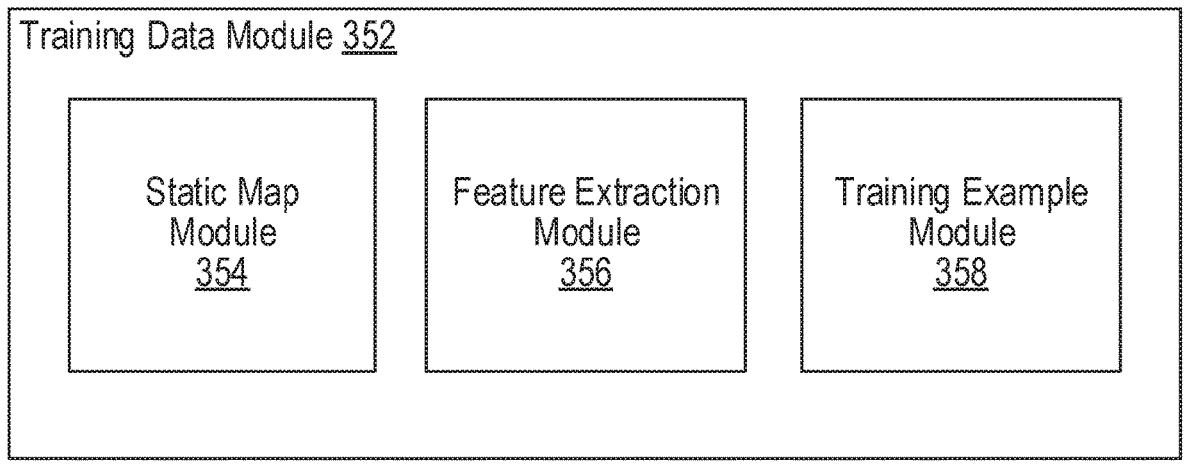
FIG. 3B illustrates an example training data module, according to an embodiment of the present technology.

FIG. 3B illustrates an example training data module 352, according to an embodiment of the present technology. In some embodiments, the training data module 304 of FIG. 3A can be implemented with the training data module 352. The training data module 352 can be configured to generate training data for training one or more machine learning models to distinguish between static and non-static objects. As shown in the example of FIG. 3B, the training data module 352 can include a static map module 354, a feature extraction module 356, and a training example module 358.

The static map module 354 can be configured to obtain information describing a static map of a previously mapped geographic location. The static map may be determined from a plurality of three-dimensional representations (e.g., point cloud representations, image-based representations) of the geographic location that have been determined by vehicles driving the geographic location repeatedly over an extended period of time (e.g., 6 months, 1 year, etc.) and under various different conditions (e.g., time of day, weather, etc.). The different representations of the geographic location that were captured under different conditions can help determine which objects in the geographic location consistently remain static across the three-dimensional representations (e.g., object remains in the same place, such as a fire hydrant) and those objects that appear inconsistently across the three-dimensional representations (e.g., object appears in different places, such as a pedestrian). In this example, objects that consistently remain static can be associated with higher probabilities of being static objects while objects that appear inconsistently can be associated with lower probabilities of static objects. As a result, objects in the three-dimensional representations can be classified as being static or dynamic based on an unsupervised learning process, as described below. These unsupervised classifications can be used to generate machine learning models for classifying objects as static or dynamic. These machine learning models can be applied to three-dimensional representations of other geographic locations for which no static map exists to classify objects encountered in those geographic locations as being static or dynamic. In some embodiments, such classifications can be used to generate static maps for the other geographic locations. For example, a fleet of vehicles may be deployed to capture three-dimensional representations of the geographic location. For example, each fleet vehicle can determine one or more point cloud representations of the geographic location and corresponding image-based representations of the geographic location. Each point cloud representation and corresponding image-based representation can be aligned with respect to time. These three-dimensional representations can be aggregated to produce the static map of the geographic location. In some embodiments, the static map represents the geographic location as a voxel grid in which each voxel is assigned a probability between 0 and 1 indicating whether a static object is represented within the voxel. These probabilities can be determined based on generally known approaches for ray casting based on point cloud data. Therefore, a group of voxels within the voxel grid that represent a static object can be associated with high probabilities that are indicative of a static object being present. In contrast, voxels in the voxel grid within which no static object is represented can be associated with low probabilities that are indicative of no static object being present. In various embodiments, the three-dimensional representations captured by the fleet of vehicles and the voxel grid representation of the geographic location can be used to train a machine learning model to distinguish between static and non-static objects based on the unsupervised learning process, as described below. In some embodiments, a static map of a geographic location can be used to classify whether a given object is a static or dynamic element. For example, a three-dimensional representation of the geographic location can be determined by a fleet vehicle. The three-dimensional representation can include various objects that may be static or dynamic. In this example, the three-dimensional representation can be evaluated with respect to the static map to classify objects as static or dynamic. For instance, objects represented in both the static map and the three-dimensional representation can be classified as static objects. Further, objects not represented in the static map but are represented in the three-dimensional representation can be classified as dynamic objects.

The feature extraction module 356 can extract visual features from the three-dimensional representations of the geographic location. The three-dimensional representations may be captured by a fleet of vehicles, as described above. In some embodiments, the feature extraction module 356 can extract visual features that can be used to train a machine learning model to identify non-static objects in visual data (e.g., point cloud data, image data, video data, etc.). For example, in various embodiments, the feature extraction module 356 can identify one or more voxels in the voxel grid with low probabilities of corresponding to a static object. The one or more voxels can be grouped with contiguous voxels that are also associated with low probabilities of corresponding to a static object. Thus, the feature extraction module 356 can determine one or more groups of voxels in the voxel grid with low probabilities of corresponding to static objects. In some embodiments, the feature extraction module 356 can also determine the one or more groups of voxels based in part on their corresponding optical flow. In some embodiments, the feature extraction module 356 can extract visual features from each of the three-dimensional representations of the geographic location based on regions defined by the groups of voxels. For example, the feature extraction module 356 can obtain a first three-dimensional representation of the geographic location. The first three-dimensional representation can include a point cloud representation of the geographic location and a corresponding image-based representation of the geographic location. In this example, the regions defined by the groups of voxels can be projected onto the image-based representation of the geographic location. Once projected, the regions defined by the groups of voxels can demarcate visual features that likely correspond to non-static objects. The feature extraction module 356 can extract these visual features from the image-based representation of the geographic location. The extracted visual features can be used to generate examples for training the machine learning model, as described below. In other embodiments, the feature extraction module 356 can extract visual features that can be used to train a machine learning model to identify static objects in visual data (e.g., point cloud data, image data, video data). For example, the feature extraction module 356 can determine one or more groups of voxels in a voxel grid with high probabilities of corresponding to static objects. Visual features that are representative of static objects can be extracted based on the groups of voxels and be used to generate training examples for training the machine learning model to identify static objects.

The training example module 358 can generate training examples based on visual features extracted by the feature extraction module 356. For example, the training example module 358 can automatically generate a training example based on visual features extracted from a three-dimensional representation of a geographic location. Further, the training example module 358 can automatically label the extracted visual features based on an unsupervised process for generating training examples. For example, a group of voxels in a voxel grid of a geographic location may define a region with a low probability of corresponding to a static object. The region can be projected onto a corresponding image-based representation of the geographic location. Visual features can be extracted from the image-based representation. These visual features can be included in a training example that is labeled as a non-static object. In another example, a group of voxels in a voxel grid of a geographic location may define a region with a high probability of corresponding to a static object. The region can be projected onto a corresponding image-based representation of the geographic location. Visual features can be extracted from the image-based representation. These visual features can be included in a training example that is labeled as a static object. Many variations are possible.

Figure 4:
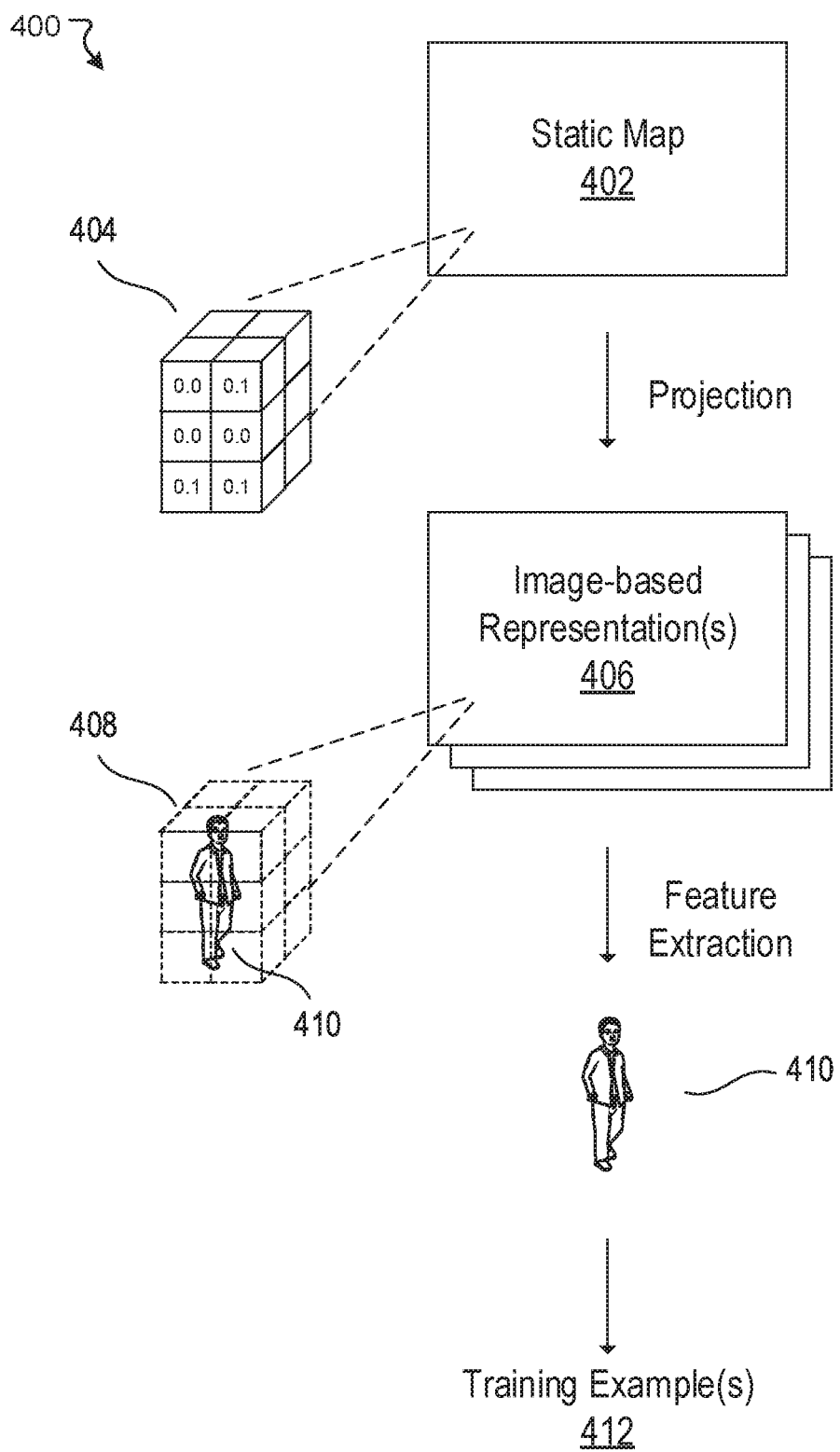
FIG. 4 illustrates an example diagram, according to an embodiment of the present technology.

FIG. 4 illustrates an example diagram 400 for generating training examples based on functionality of the unsupervised training module 204, according to an embodiment of the present technology. In particular, the example of FIG. 4 illustrates an unsupervised process for generating training examples to train a machine learning model to recognize non-static objects. For example, a static map 402 of a geographic location can be obtained. The static map 402 may be determined from a plurality of three-dimensional representations (e.g., point cloud representations, image-based representations, etc.) of the geographic location. For example, a fleet of vehicles may be deployed to capture three-dimensional representations of the geographic location. For example, each fleet vehicle can determine one or more point cloud representations of the geographic location and corresponding image-based representations of the geographic location. Each point cloud representation and corresponding image-based representation can be aligned with respect to time. These three-dimensional representations can be aggregated to produce the static map 402 of the geographic location. In some embodiments, the static map 402 represents the geographic location as a voxel grid in which each voxel is assigned a probability between 0 and 1 indicating whether a static object is represented within the voxel. In the example of FIG. 4, the voxel grid includes a group of voxels 404 associated with a low probability of corresponding to a static object. In various embodiments, the group of voxels 404 can be used to extract visual features for training the machine learning model from image-based representations 406 of the geographic location. For example, a region 408 defined by the group of voxels 404 can be projected onto a first image-based representation 406 of the geographic location. Once projected, the region 408 defined by the group of voxels can demarcate visual features 410 that likely correspond to non-static objects. These visual features 410 can be extracted from the first image-based representation 406 of the geographic location. The extracted visual features can be used to generate a labeled example for training the machine learning model to identify non-static objects. The unsupervised process for generating training examples can continue generating examples based on other groups of voxels associated with low probabilities and from other image-based representations 406 of the geographic location, as described above. Many variations are possible. For example, in some embodiments, the unsupervised process can be adapted to generate training examples for training a machine learning model to identify static objects. In some embodiments, the unsupervised process can be adapted to generate training examples from point cloud representations of geographic locations. For example, a machine learning model can be trained based on examples of point cloud representations corresponding to non-static objects. In this example, the machine learning model can predict whether a given point cloud representation includes non-static objects. Similarly, a machine learning model can be trained based on examples of point cloud representations corresponding to static objects. In this example, the machine learning model can predict whether a given point cloud representation includes static objects.

FIG. 5A illustrates an example method 500, according to an embodiment of the present technology. At block 502, information describing a static map of a geographic location can be obtained. The static map can be determined based at least in part on a plurality of three-dimensional representations of the geographic location captured by sensors of a fleet of vehicles. At block 504, at least one training example that includes visual features and a corresponding label can be generated based on an unsupervised process for generating training examples. The visual features can be extracted based on the static map and at least one three-dimensional representation of the geographic location. At block 506, at least one machine learning model can be trained to distinguish between static objects and non-static objects in visual data based on the at least one training example, wherein the at least one machine learning model is trained based on an unsupervised learning process.

Figure 5B:
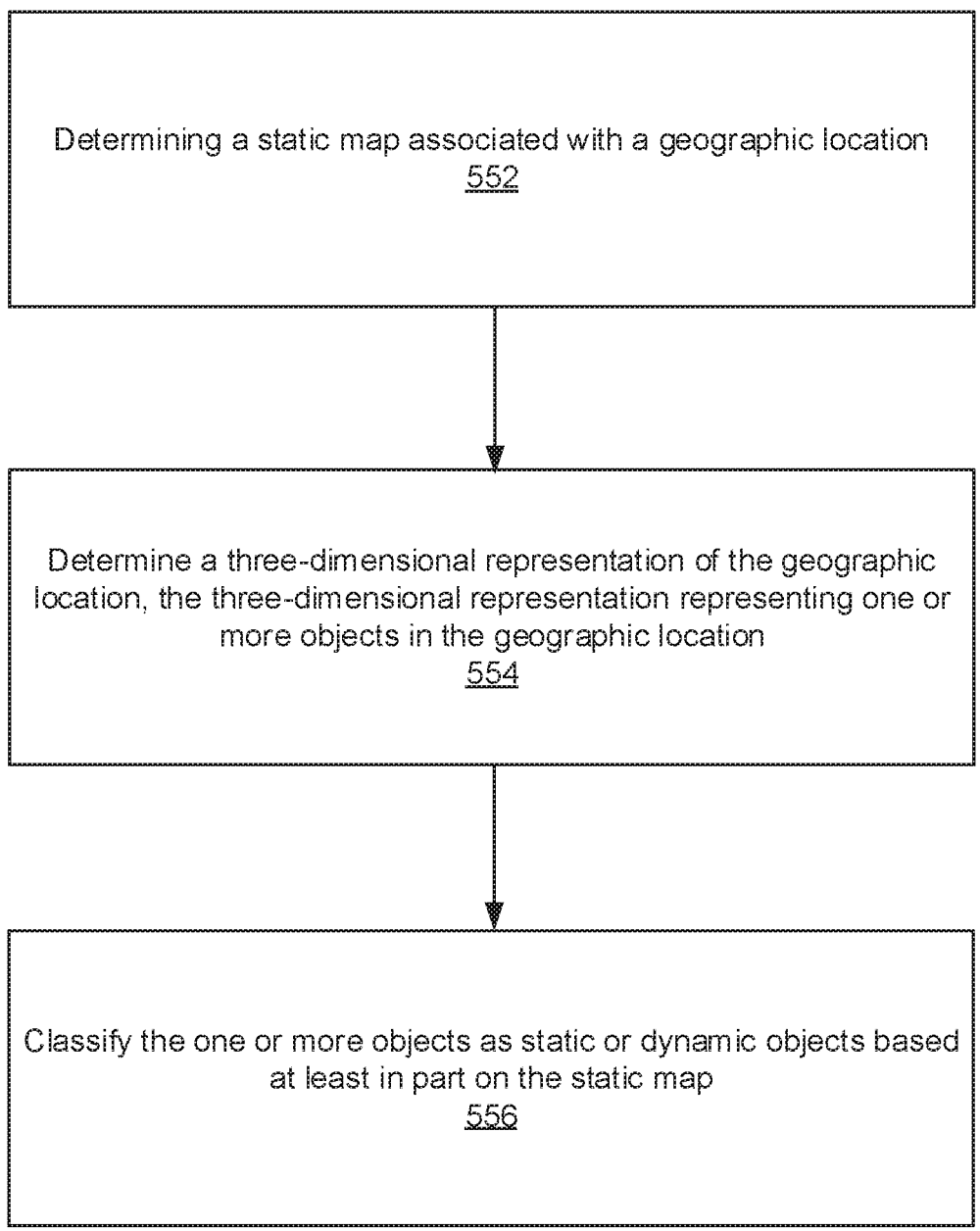

FIG. 5B illustrates an example method 550, according to an embodiment of the present technology. At block 552, a static map associated with a geographic location can be determined. At block 554, a three-dimensional representation of the geographic location can be determined. The three-dimensional representation can represent one or more objects in the geographic region. At block 556, the one or more objects can be classified as static or dynamic objects based at least in part on the static map. For example, the static map can represent objects that are static within the geographic location. Thus, the static map and the three-dimensional representation can be evaluated with respect to one another to classify objects represented in the three-dimensional representation as being static or dynamic.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the sensor calibration module 202 may be implemented by one or more computing systems of the transportation management system 660. In some embodiments, some or all modules of the sensor calibration module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
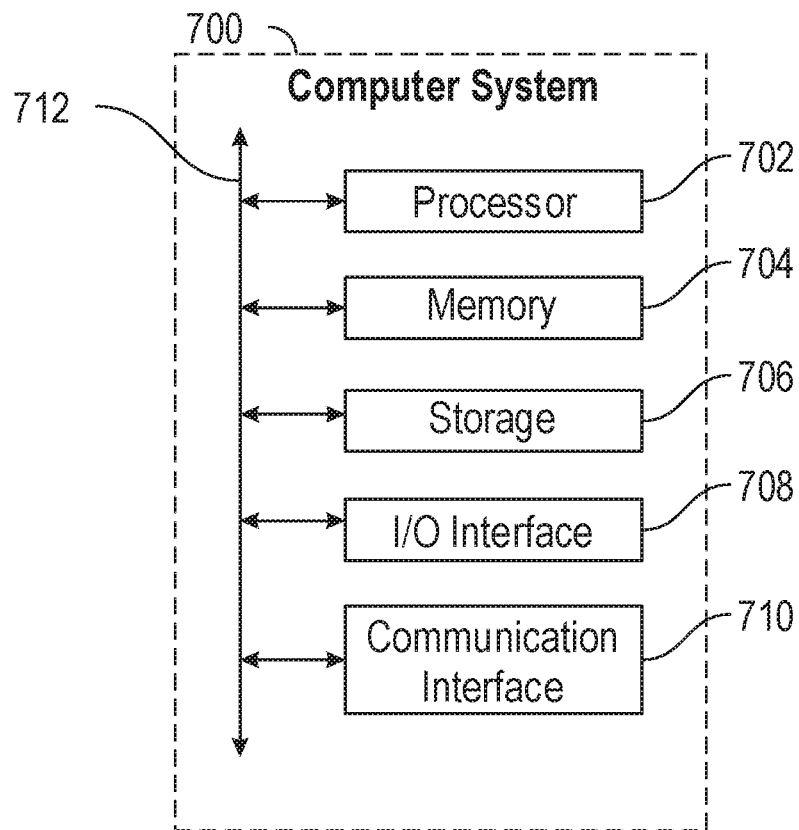
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   obtaining, by a computing system, information describing a static map of a geographic location, wherein the static map is determined based at least in part on at least one three-dimensional representation of the geographic location captured by one or more sensors of one or more vehicles;
   generating, by the computing system, at least one training example that includes visual features and a corresponding label based on an unsupervised process for generating training examples, wherein the visual features are extracted based on the static map and the at least one three-dimensional representation of the geographic location, and wherein generating the at least one training example comprises:
      determining, by the computing system, one or more contiguous voxels associated with the static map based on respective probabilities associated with the one or more contiguous voxels, wherein each voxel of the one or more contiguous voxels is associated with a probability that indicates whether a static object or a dynamic object is represented within the voxel;
   training, by the computing system, at least one machine learning model to distinguish between static objects and dynamic objects in visual data based on the at least one training example, wherein the at least one machine learning model is trained based on an unsupervised learning process; and
   applying, by the computing system, the at least one machine learning model to determine whether an object is a static object or a dynamic object.

2. The computer-implemented method of claim 1, wherein the one or more sensors include one or more optical cameras and Light Detection And Ranging (LiDAR) sensors.

3. The computer-implemented method of claim 1, wherein generating the at least one training example further comprises:
   determining, by the computing system, the one or more contiguous voxels have a low threshold probability of corresponding to a static object; and
   extracting, by the computing system, the visual features from a region in the at least one three-dimensional representation of the geographic location that corresponds to the one or more contiguous voxels associated with the static map.

4. The computer-implemented method of claim 3, further comprising:
   determining, by the computing system, the corresponding label for the visual features based on the one or more contiguous voxels having the low threshold probability of corresponding to the static object.

5. The computer-implemented method of claim 3, wherein the at least one three-dimensional representation of the geographic location includes at least a point cloud representation of the geographic location and a corresponding image-based representation of the geographic location.

6. The computer-implemented method of claim 5, wherein extracting the visual features from the region in the at least one three-dimensional representation further comprises:

projecting, by the computing system, the one or more contiguous voxels onto the corresponding image-based representation of the geographic location.

7. The computer-implemented method of claim 1, wherein generating the at least one training example further comprises:
   determining, by the computing system, the one or more contiguous voxels have a high threshold probability of corresponding to a static object;
   extracting, by the computing system, the visual features from a region in the at least one three-dimensional representation of the geographic location that corresponds to the one or more contiguous voxels associated with the static map; and
   determining, by the computing system, the corresponding label for the visual features based on the one or more contiguous voxels having the high threshold probability of corresponding to the static object.

8. The computer-implemented method of claim 1, further comprising:
   determining, by the computing system, at least one three-dimensional representation of a different geographic location, the at least one three-dimensional representation of the different geographic location including a point cloud representation and a corresponding image-based representation of the different geographic location;
   determining, by the computing system, one or more dynamic objects that are represented in the at least one three-dimensional representation of the different geographic location based on provision of the image-based representation to the at least one machine learning model; and
   removing, by the computing system, the one or more dynamic objects from the at least one three-dimensional representation of the different geographic location.

9. The computer-implemented method of claim 8, wherein the one or more dynamic objects are excluded from a static map generated for the different geographic location.

10. The computer-implemented method of claim 1, further comprising:
    determining, by the computing system, visual data associated with the geographic location;
    determining, by the computing system, at least one object represented in the visual data; and
    determining, by the computing system, whether the at least one object is a static object or a dynamic object based at least in part on the static map.

11. A system comprising:
    at least one processor; and
    a memory storing instructions that, when executed by the at least one processor, cause the system to perform:
    obtaining information describing a static map of a geographic location, wherein the static map is determined based at least in part on at least one three-dimensional representation of the geographic location captured by one or more sensors of one or more vehicles;
    generating at least one training example that includes visual features and a corresponding label based on an unsupervised process for generating training examples, wherein the visual features are extracted based on the static map and the at least one three-dimensional representation of the geographic location, and wherein generating the at least one training example comprises:
    determining one or more contiguous voxels associated with the static map based on respective probabilities associated with the one or more contiguous voxels, wherein each voxel of the one or more contiguous voxels is associated with a probability that indicates whether a static object or a dynamic object is represented within the voxel;
    training at least one machine learning model to distinguish between static objects and dynamic objects in visual data based on the at least one training example, wherein the at least one machine learning model is trained based on an unsupervised learning process; and
    applying the at least one machine learning model to determine whether an object is a static object or a dynamic object.

12. The system of claim 11, wherein the static object and the dynamic object are located in different regions of the static map.

13. The system of claim 11, wherein instructions for generating the at least one training example further cause the system to perform:
    determining the one or more contiguous voxels have a low threshold probability of corresponding to a static object; and
    extracting the visual features from a region in the at least one three-dimensional representation of the geographic location that corresponds to the one or more contiguous voxels associated with the static map.

14. The system of claim 13, wherein the instructions further cause the system to perform:
    determining the corresponding label for the visual features based on the one or more contiguous voxels having the low threshold probability of corresponding to the static object.

15. The system of claim 13, wherein the at least one three-dimensional representation of the geographic location includes at least a point cloud representation of the geographic location and a corresponding image-based representation of the geographic location.

16. A non-transitory computer-readable storage medium including instructions that, when executed by at least one processor of a computing system, cause the computing system to perform:
    obtaining information describing a static map of a geographic location, wherein the static map is determined based at least in part on at least one three-dimensional representation of the geographic location captured by one or more sensors of one or more vehicles;
    generating at least one training example that includes visual features and a corresponding label based on an unsupervised process for generating training examples, wherein the visual features are extracted based on the static map and the at least one three-dimensional representation of the geographic location, and wherein generating the at least one training example comprises:
    determining one or more contiguous voxels associated with the static map based on respective probabilities associated with the one or more contiguous voxels, wherein each voxel of the one or more contiguous voxels is associated with a probability that indicates whether a static object or a dynamic object is represented within the voxel;
    training at least one machine learning model to distinguish between static objects and dynamic objects in visual data based on the at least one training example, wherein the at least one machine learning model is trained based on an unsupervised learning process; and applying the at least one machine learning model to determine whether an object is a static object or a dynamic object.

17. The non-transitory computer-readable storage medium of claim 16, wherein the one or more sensors include one or more optical cameras and Light Detection And Ranging (LiDAR) sensors.

18. The non-transitory computer-readable storage medium of claim 16, wherein instructions for generating the at least one training example further cause the computing system to perform:
   determining the one or more contiguous voxels have a low threshold probability of corresponding to a static object; and
   extracting the visual features from a region in the at least one three-dimensional representation of the geographic location that corresponds to the one or more contiguous voxels associated with the static map.

19. The non-transitory computer-readable storage medium of claim 18, wherein the instructions further cause the computing system to perform:
   determining the corresponding label for the visual features based on the one or more contiguous voxels having the low threshold probability of corresponding to the static object.

20. The non-transitory computer-readable storage medium of claim 19, wherein the at least one three-dimensional representation of the geographic location includes at least a point cloud representation of the geographic location and a corresponding image-based representation of the geographic location.

* * * * *